(12) United States Patent
Xian et al.

(10) Patent No.: US 11,622,500 B2
(45) Date of Patent: Apr. 11, 2023

(54) POWER TOOL AND CONTROL METHOD FOR THE SAME

(71) Applicant: Nanjing Chervon Industry Co., Ltd., Nanjing (CN)

(72) Inventors: Chao Xian, Nanjing (CN); Jifeng Feng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 465 days.

(21) Appl. No.: 16/855,045

(22) Filed: Apr. 22, 2020

(65) Prior Publication Data

US 2020/0337226 A1 Oct. 29, 2020

(30) Foreign Application Priority Data

Apr. 26, 2019 (CN) .......................... 201910346514.5

(51) Int. Cl.
| | | |
|---|---|---|
| *H02P 1/04* | (2006.01) | |
| *H02P 1/28* | (2006.01) | |
| *H02P 27/08* | (2006.01) | |
| *A01D 34/00* | (2006.01) | |
| *A01D 101/00* | (2006.01) | |

(52) U.S. Cl.
CPC ............. *A01D 34/006* (2013.01); *H02P 1/04* (2013.01); *H02P 1/28* (2013.01); *H02P 27/08* (2013.01); *A01D 2101/00* (2013.01)

(58) Field of Classification Search
CPC ..... A01D 34/006; A01D 2101/00; H02P 1/28; H02P 1/04; H02P 27/08; H02P 6/28
See application file for complete search history.

(56) References Cited

U.S. PATENT DOCUMENTS

| | | | | |
|---|---|---|---|---|
| 9,866,155 B2* | 1/2018 | Sugawara | ............... | H02P 6/185 |
| 10,184,401 B2* | 1/2019 | Bellabal | .................... | F02C 7/20 |
| 10,483,884 B2* | 11/2019 | Wu | ........................ | H02P 29/032 |
| 10,486,295 B2* | 11/2019 | Aradachi | ............... | H02K 7/145 |
| 2009/0261766 A1* | 10/2009 | Lurk | .................... | H02P 29/026 |
| | | | | 318/400.42 |
| 2012/0159916 A1* | 6/2012 | Ishii | ........................ | B60L 1/003 |
| | | | | 56/10.2 G |
| 2015/0042247 A1* | 2/2015 | Kusakawa | ............ | H02P 7/2913 |
| | | | | 318/700 |
| 2016/0297059 A1* | 10/2016 | Aradachi | ............... | H02K 7/145 |
| 2017/0019044 A1* | 1/2017 | Godlieb | .................... | H02P 7/29 |

FOREIGN PATENT DOCUMENTS

| | | |
|---|---|---|
| CN | 107070365 A | 8/2017 |
| WO | 00/77920 A1 | 12/2000 |

OTHER PUBLICATIONS

EPO, extended European search report issued on European patent application No. 20170963.1, dated Aug. 3, 2020, 14 pages.

* cited by examiner

*Primary Examiner* — Thai T Dinh
(74) *Attorney, Agent, or Firm* — Greenberg Traurig, LLP

(57) ABSTRACT

A power tool includes a motor and a power supply for supplying power to the motor. A driving circuit is connected to the motor. A voltage detection unit is used for detecting the voltage of the motor. A controller is configured to perform the following operations: if the motor voltage is greater than or equal to a preset voltage, the driving circuit will apply a voltage to the motor with a second slope, wherein the value range of the second slope is from 0 to 0.3. The disclosure also discloses a control method for starting under load of a power tool.

14 Claims, 7 Drawing Sheets

POWER TOOL AND CONTROL METHOD FOR THE SAME

RELATED APPLICATION INFORMATION

This application claims the benefit under 35 U.S.C. § 119(a) of Chinese Patent Application No. CN 201910346514.5, filed on Apr. 26, 2019, the disclosure of which is incorporated herein by reference in its entirety.

BACKGROUND

The present disclosure generally relates to power tools, and more particularly to power tools and control methods.

In the existing power tool, when the power tool is started with a load, a manner in which the start-up voltage of the motor is increased increases the initial rotational speed of the motor, thereby realizing the rotation for the motor and achieving the purpose of starting the power tool.

In one aspect, an increase of the start-up voltage of the motor will result in a larger starting current passing through the motor. However, a significantly large starting current may lead to burnout in the motor or other circuit components.

In another aspect, if the starting voltage of the motor is slowly increased, the power tool will start slowly with a load, which affects the experience to the user.

The statements in this section merely provide background information related to the present disclosure and may not constitute prior art.

SUMMARY

To solve the shortcomings in the existing art, the object of the present disclosure is to provide a power tool and a control method for the power tool capable of starting quickly with a load.

In one example, a power tool includes a motor; a power supply unit that supplies power to the motor; a driving circuit, which is connected to the motor to enable the power supply unit to apply a voltage to the motor; a voltage detection unit that detects the voltage of the motor; a controller, which is configured to perform the following operations: if the voltage of the motor is greater than or equal to a preset voltage, the driving circuit is controlled to apply a voltage by a second slope to the motor; wherein the value range of the second slope is greater than or equal to zero and less than or equal to 0.3.

In another example, a control method for a power tool is provided, wherein the power tool comprises a motor and a driving circuit, and the control method comprises: detecting the voltage of the motor; the driving circuit controlled to apply a voltage by a second slope to the motor in condition that the voltage of the motor is greater than or equal to a preset voltage; wherein the value range of the second slope is greater than or equal to zero and less than or equal to 0.3.

In yet another example, a control method for a power tool started with a load is provided, the power tool includes a motor and the control method comprises: detecting a voltage of the motor; applying a progressive increments of voltage by a first slope to the motor in condition that the power tool is in a first start-up stage; applying a voltage that varies as the second slope to the motor in condition that the power tool is in a second start-up stage; wherein the power tool switches from the first start-up stage to the second start-up stage in condition that the voltage of the motor is greater than or equal to a preset voltage.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of exemplary examples and not all possible implementations and are not intended to limit the scope of the present disclosure. Corresponding reference numerals indicate corresponding parts throughout the several views of the drawings.

DETAILED DESCRIPTION

The power tools of the present disclosure include but are not limited to the following: power tools such as screwdrivers, electric drills, wrenches, angle grinders, that require speed adjustment; power tools such as sanders that may be used to sand the workpiece; electric hammers and other power tools that may be used for impact. The power tools may also be garden tools, such as lawnmowers, snow sweepers, trimmers and chainsaws. Besides, these power tools may be used for other purposes, such as blenders. As long as these power tools employ the substance of the technical solution disclosed below, they shall fall within the protection scope of the present disclosure.

In order to facilitate the explanation, the lawnmower 100 is taken as an example. The lawnmower 100 may be a hand-pushed mower or a riding mower.

Figure 1:
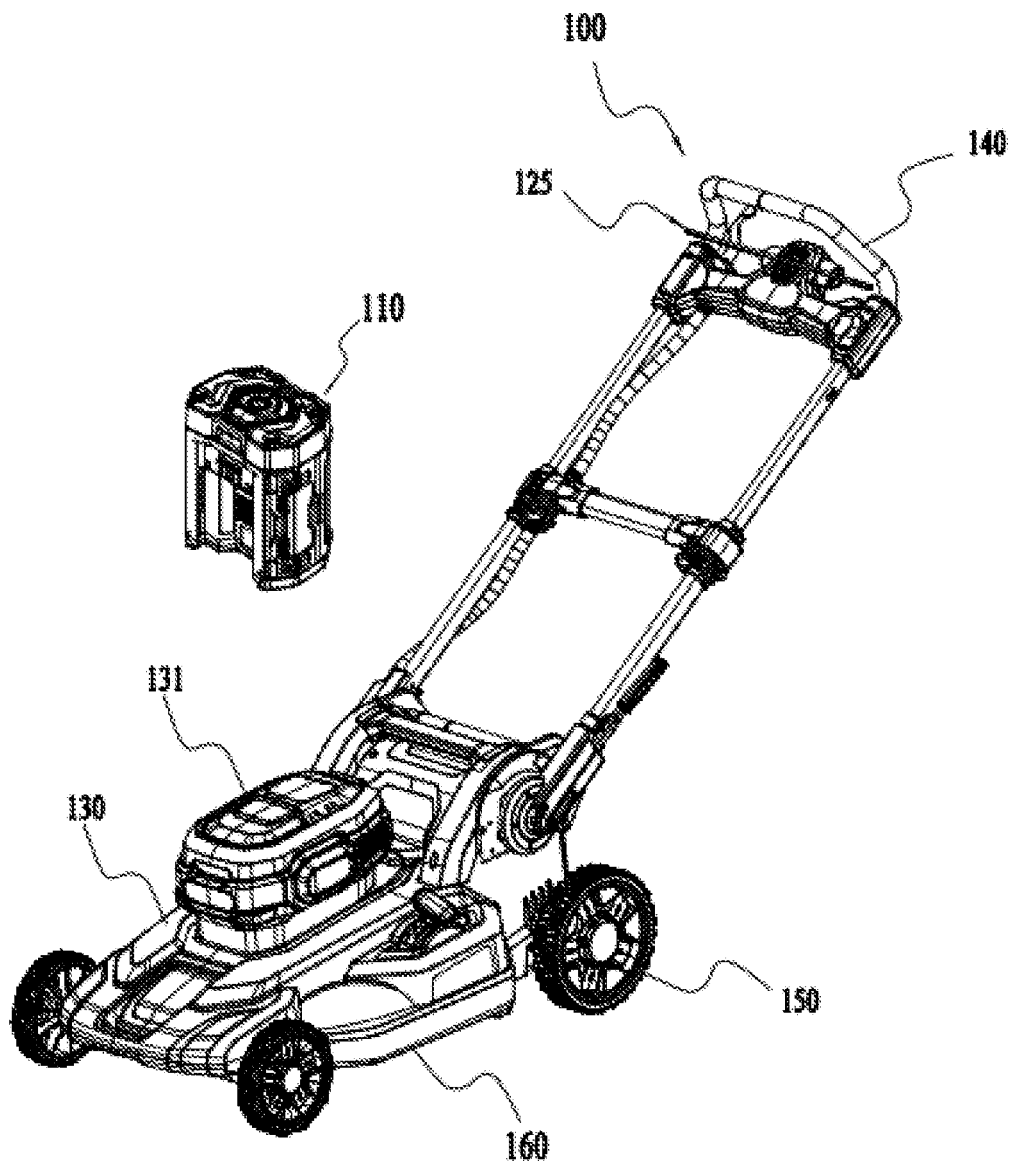
FIG. 1 is a structural diagram of a lawnmower according to an example.

Referring to FIG. 1, the lawnmower includes a power supply unit 110, a motor 120, a housing 130, a handle 140, wheels 150, a blade, and a deck 160.

The power supply unit 110 is used as a power source to provide kinetic energy for the lawnmower 100. In some examples, the power supply unit 110 is a battery pack, and the battery pack and the housing 130 are detachably coupled. As shown in FIG. 1, the housing 130 is provided with a battery compartment 1311 for receiving the battery pack. The battery compartment 1311 is disposed on the upper side of the deck 160. In some examples, the lawnmower 100 includes more than one battery pack. In some examples, the voltage of the battery pack is greater than or equal to 30V. Further, the voltage of the battery pack is greater than or equal to 48V.

As a tool accessory of the lawnmower 100, the blade disposed in the deck 160 is used to realize the mowing function.

The motor 120 is used for driving the blade. The motor 120 is operatively coupled to the blade to drive the rotation of the blade, thus achieving the mowing function. In some examples, the blade is directly connected to the motor shaft of the motor 120. In other examples, the blade can be connected to the motor 120 through a transmission device or a deceleration structure.

The deck 160 is used to carry and install the motor 120. The deck 160 is formed with a cutting cavity.

The handle 140 is used for being held by a user to facilitate pushing the lawnmower 100. The lawnmower 100 also includes a self-propelled motor for driving the wheels 150 to rotate, which can ensure the walking function of the lawnmower 100.

Referring to FIG. 0.2, the lawnmower 100 also includes a power supply circuit 121, a driving circuit 122, a voltage detection unit 123, a rotational speed detection unit 124, a trigger switch 125 and a controller 126.

The power supply circuit 121 is electrically connected to the power supply unit 110 and is used to convert the power voltage supplied from the power supply unit 110 to each functional circuit. The functional circuits mentioned herein include, but are not limited to circuits, chips or electronic devices in the lawnmower 100, which are used to realize functions such as detection, drive, control, calculation, etc. In some examples, the lawnmower 100 may include a plurality of power supply circuits 121 for supplying power to each functional module separately.

Figure 2:
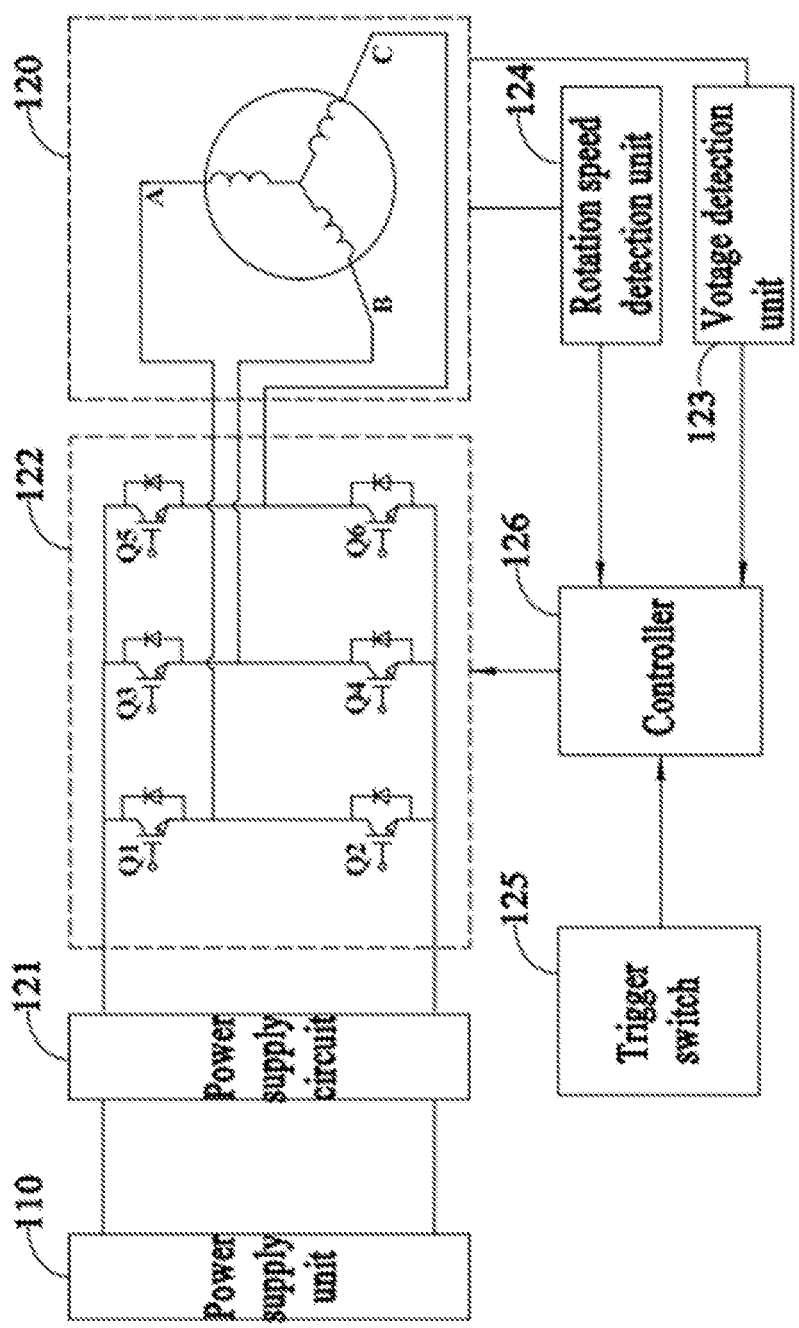
FIG. 2 is a circuit diagram of the lawnmower according to an example.

The driving circuit 122 is electrically connected to the motor 120 so that the power supply unit 110 applies the voltage to the motor 120. In some examples, the motor 120 is a three-phase brushless motor 120, which includes three-phase windings. As shown in FIG. 2, the three-phase windings U, V and W constitute a star connection. In some examples, the three-phase windings are connected in an angular formation. The driving circuit 122 includes six switching elements configured of FET or IGBT transistors. For the convenience of illustration, taking the IGBT transistor as an example, the gates of the switching elements Q1-Q6 are connected to the controller 126, and the collectors and emitters of the switching elements Q1-Q6 are connected to the three-phase windings. By turning the switching elements Q1-Q6 on and off based on the driving signal outputted from the controller 126, the voltage applied on the motor 120 can be modulated and the rotational speed together with the phase inversion can also be controlled.

The rotational speed detection unit 124 is configured to detect a rotational speed of the motor 120. In some examples, the rotational speed detection unit 124 includes hall sensors. Three hall sensors are arranged near the rotor at 60 degree intervals along the rotational direction to detect the speed of the motor. In some examples, the rotational speed detection unit 124 can also use sensorless methods or other types of sensors, such as an optical or magnetic encoder or a resolver.

The voltage detection unit 123 is configured to detect a voltage of the motor 120. In some examples, the voltage detection unit 123 includes a voltage sensor and other peripheral circuits connected to the voltage sensor. In some examples, the voltage detection unit 123 is integrated with the controller 126. It should be noted that the voltage detection unit 123 may use any other technical solution capable of detecting the voltage of the motor 120.

The trigger switch 125 is disposed on the housing 130 that is operatively switched by the user to start the lawnmower 100. In the example, the trigger switch 125 is a trigger arranged on the housing. After operating the trigger switch 125, the lawnmower 100 is supplied by the power supply unit 110 and enters a start-up stage.

According to detection signals inputted by the rotational speed detection unit 124 and/or the voltage detection unit 123, the controller 126 generates a corresponding control signal to control the driving circuit 122, so that the corresponding voltage can be outputted to the motor 120 until the lawnmower 100 finishes starting.

In the following, the start-up control method of the lawnmower 100 will be specifically described in combination with the actual starting state and FIG. 3A to FIG. 3D.

With the trigger switch 125 operated by the user, the lawnmower 100 enters the start-up state. In response to the input signal of the trigger switch 125, the controller 126 controls the driving circuit 122 to apply a voltage to the motor 120 by a first slope while the voltage of the motor 120 is less than the preset voltage V0.

In some examples, the voltage detection unit 123 detects the voltage of the motor 120. The lawnmower 100 is in the first start-up stage in condition that the voltage of the motor 120 is less than the preset voltage. When the lawnmower 100 is in the first start-up stage, the controller 126 is configured for outputting a control signal to the driving circuit 122, so that the gradually increasing voltage is applied to the motor 120 by the first slope. At this stage, the rotational speed of the motor 120 increases with raising the voltage applied to the motor 120.

Specifically, the control signal outputted by the controller 126 is a PWM signal. When the lawnmower 100 is in the first start-up stage, the controller 126 outputs the PWM signal whose duty cycle is increased gradually. As shown in FIG. 3B, when the lawnmower 100 is in the first start-up stage, the duty cycle of the PWM signal is gradually increased by the first slope.

When the voltage of the motor 120 is greater than or equal to the preset voltage, the lawnmower 100 is switched from the first start-up stage to the second start-up stage. When the lawnmower 100 is in the second start-up stage, the controller 126 is configured to control the driving circuit 122 to apply a voltage to the motor 120 by a second slope.

In some examples, the control signal outputted by the controller 126 is a PWM signal. The voltage detection unit 123 detects the voltage of the motor 120. When the voltage of the motor 120 is greater than or equal to the preset voltage value, the controller 126 outputs a PWM signal with a fixed duty cycle to the driving circuit 122. As shown in FIG. 3B, the lawnmower 100 is in the second start-up stage at the moment, and the duty cycle of the PWM signal is a fixed value. At this stage, the motor 120 has a specific rotational speed, and the vegetation such as weeds is cut by the blade driven by the motor 120, so that the load of the motor is changed. The rotational speed of the motor 120 is also changed with the load of the motor 120 (as shown in FIG. 3C).

Figure 4A:
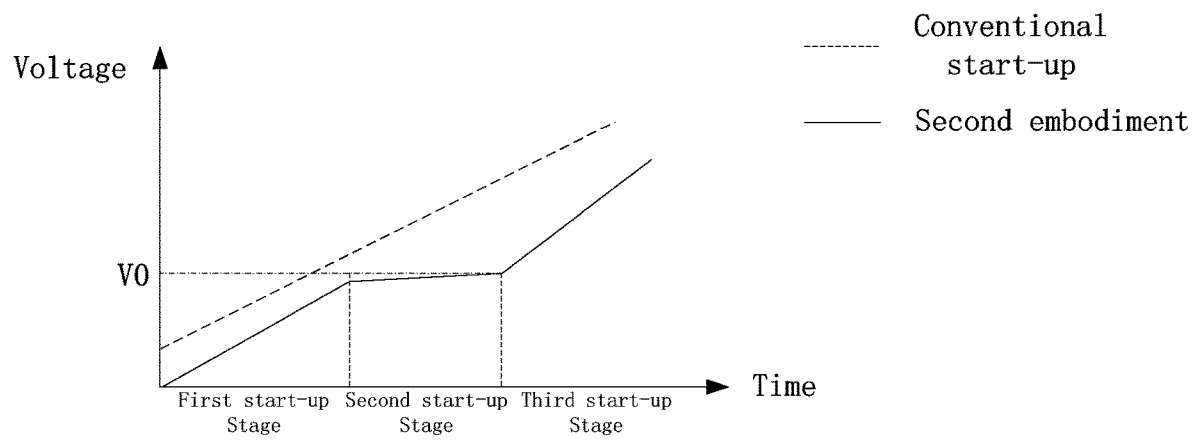
FIG. 4A shows a variation curve of the voltage applied to the motor over time according to another example.
Figure 4B:
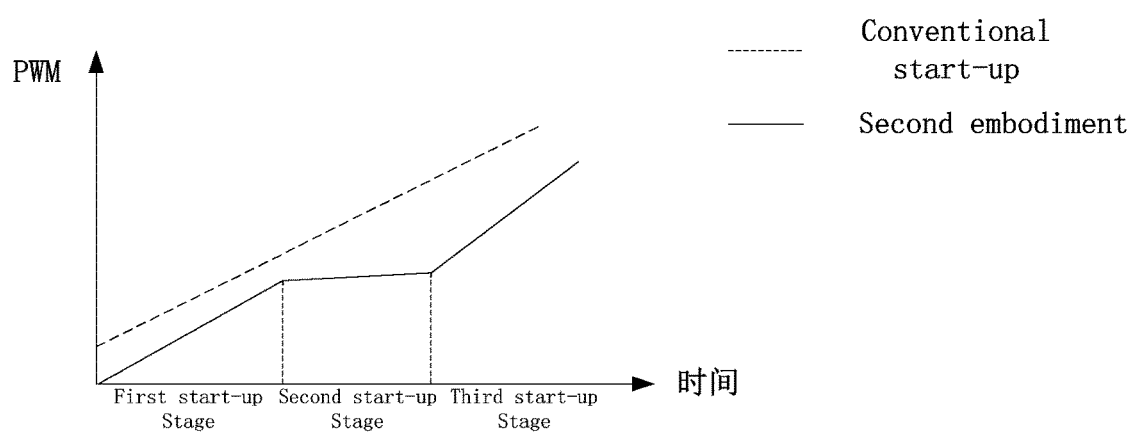
FIG. 4B shows a variation curve of the PWM control signal over time according to another example.

In other examples, if the voltage of the motor 120 is greater than or equal to the preset voltage, the controller 126 outputs a PWM signal with a duty cycle varied by the second slope to the driving circuit 122. As shown in FIG. 4A and FIG. 4B, the lawnmower 100 is in the second start-up stage and the duty cycle of the PWM signal changes by the second slope.

In one or more examples, the second slope is greater than or equal to zero and less than or equal to 0.3. If the second slope is 0, that is, the controller 126 outputs a PWM signal with a fixed duty cycle to the driving circuit 122, and the driving circuit 122 applies a fixed voltage to the motor 120. Because the voltage applied to the motor maintains a constant value, it can prevent the generation of an excessive starting current when starting the motor. Also, the blade driven by the motor 120 cuts soft vegetation such as weeds, and the load of the motor 120 will be reduced. With decreasing the load of the motor 120, the rotational speed of the motor 120 is increased, so that the motor 120 can be quickly started. If the second slope is greater than 0.3, the voltage applied to the motor 120 is increased too fast, leading to an excessive starting current and then an increased temperature of the component, which potentially causes the motor 120 and the driving circuit 122 to be burned out.

Based on the maximum current withstood by the power tool or the load of the motor 120, the present voltage is obtained. Wherein, the maximum current withstood by the power tool includes the maximum current supported by the driving circuit 122, the maximum current supported by the motor 120, or the maximum current supported by other electronic components.

In some examples, the preset voltage is obtained according to the maximum current which could be withstood by the driving circuit 122, and the preset voltage is written to the controller 126. In some examples, a one-to-one relationship between the maximum current which could be withstood by the driving circuit 122 and the preset voltage is established and saved in the tabular form to a storage unit of the power tool. The storage unit could be integrated into the controller 126 or could exist separately.

When the voltage of the motor reaches the preset voltage, the lawnmower 100 is switched from the first start-up stage to the second start-up stage in order to alter the voltage applied to the motor 120. The selection of the preset voltage and the change of the voltage not only shorten the starting time of the motor 120 but also ensures that the starting current is maintained within a range in which the lawnmower can work normally.

The rotational speed detection unit 124 detects the rotational speed of the motor 120. The controller 126 controls the driving circuit 122 for applying a voltage to the motor by a third slope in condition that the rotational speed of the motor 120 is greater than or equal to the preset rotational speed n.

In some examples, the control signal outputted by the controller 126 is a PWM signal. If the rotational speed of the motor 120 is greater than or equal to the preset rotational speed n, the controller 126 outputs a PWM signal with a duty cycle varied by the third slope to the driving circuit 122. As shown in FIG. 3B, the lawnmower 100 is in the third start-up stage and the duty cycle of the PWM signal changes with the third slope. At this stage, the voltage applied to the motor 120 also gradually increases by the third slope, and the rotational speed of the motor 120 increases until the lawnmower 100 finishes starting.

In at least one example, the range of the preset speed n is: n≤60% n0, where n0 is the speed of the motor 120 without load. If the preset speed n is higher than the preset speed of 60%, the voltage applied to the motor 120 may be too large resulting in an excessive starting current.

In at least one example, the third slope is greater than or equal to the first slope so that it reduces both the start-up time and the start-up current.

Figure 3A:
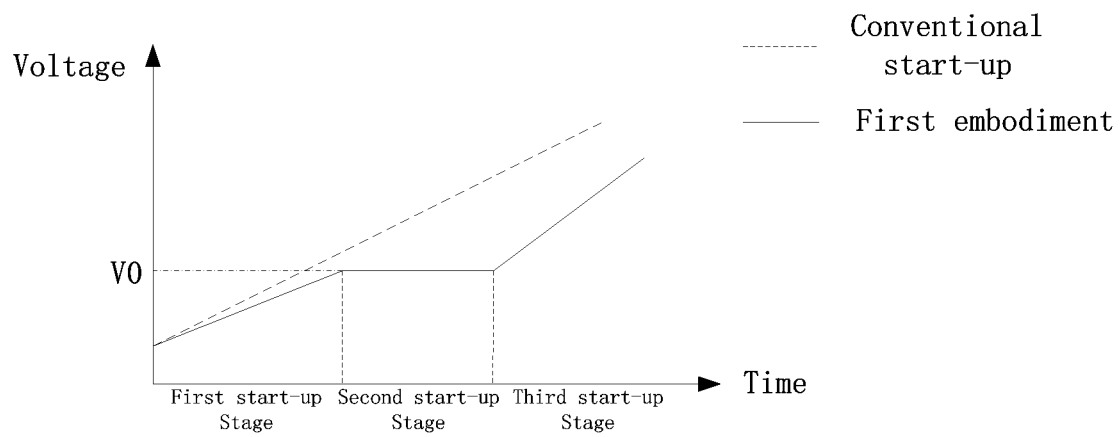
FIG. 3A shows a variation curve of a voltage applied to a motor over time according to an example.
Figure 3B:
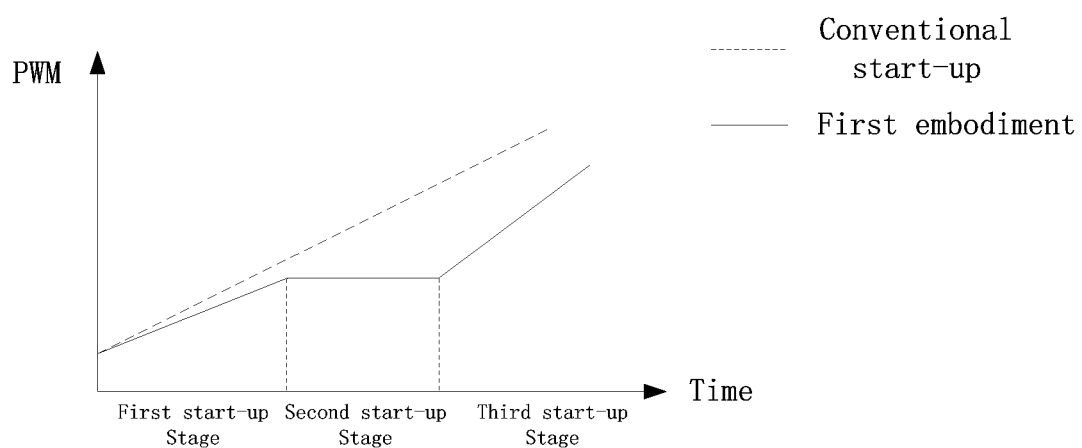
FIG. 3B shows a variation curve of the PWM control signal over time according to an example.
Figure 3C:
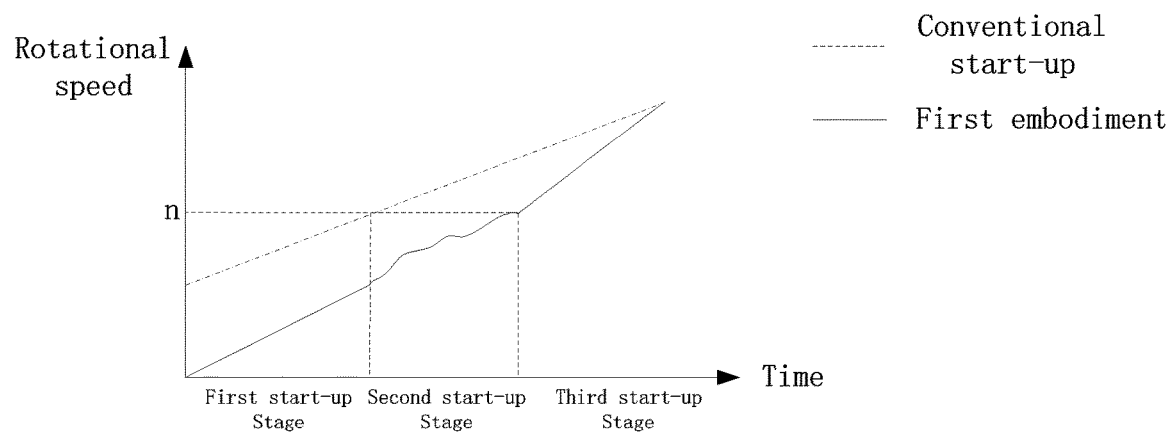
FIG. 3C shows a variation curve of the rotational speed of the motor over time according to an example.

FIG. 3A illustrates the variation curve of the voltage applied to the motor as a function of time, and the dashed line indicates the start-up process of the conventional lawnmower 100 with a load, while the solid line represents the start-up process of the lawnmower 100 with a load as one of the examples of the start-up scheme which mentioned above.

FIG. 3B illustrates the variation curve of a PWM signal as a function of time, and the dashed line indicates the start-up process of the conventional lawnmower 100 with a load, while the solid line represents the start-up process of the lawnmower 100 with a load as one of the examples of the start-up scheme which mentioned above.

FIG. 3C illustrates the variation curve of the rotational speed of the motor 120 as a function of time, and the dashed line indicates the start-up process of the conventional lawnmower 100 with a load, while the solid line represents the start-up process of the lawnmower 100 with a load as one of the examples of the start-up scheme which mentioned above.

Figure 3D:
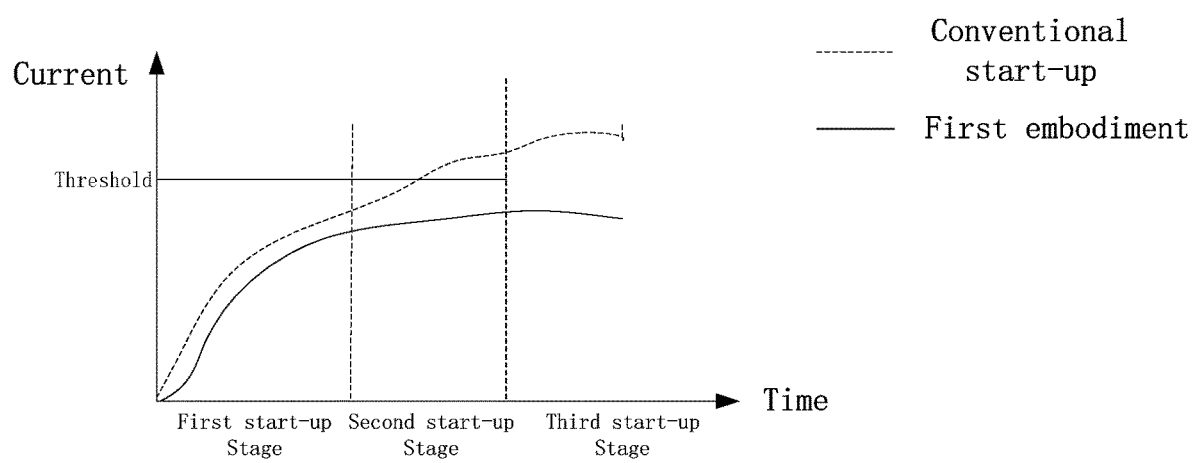
FIG. 3D shows a variation curve of the starting current of the motor over time according to an example.

FIG. 3D illustrates the variation curve of the start-up current as a function of time, and the dashed line indicates the start-up process of the conventional lawnmower 100 with a load, while the solid line represents the start-up process of the lawnmower 100 with a load as one of the examples of the start-up scheme which mentioned above.

Referring to FIGS. 3A-3D, compared with the conventional scheme of a lawnmower starting with a load, adopting the scheme of the lawnmower starting with a load that described in this disclosure can result in a low current of the lawnmower during the process of starting with a load, prevent the lawnmower from frequent starting due to an excessive start-up current during the process of starting with a load, and also reduce the start-up time of the lawnmower. The scheme described in this disclosure is especially suitable for starting the lawnmower under heavy load.

Figure 5:
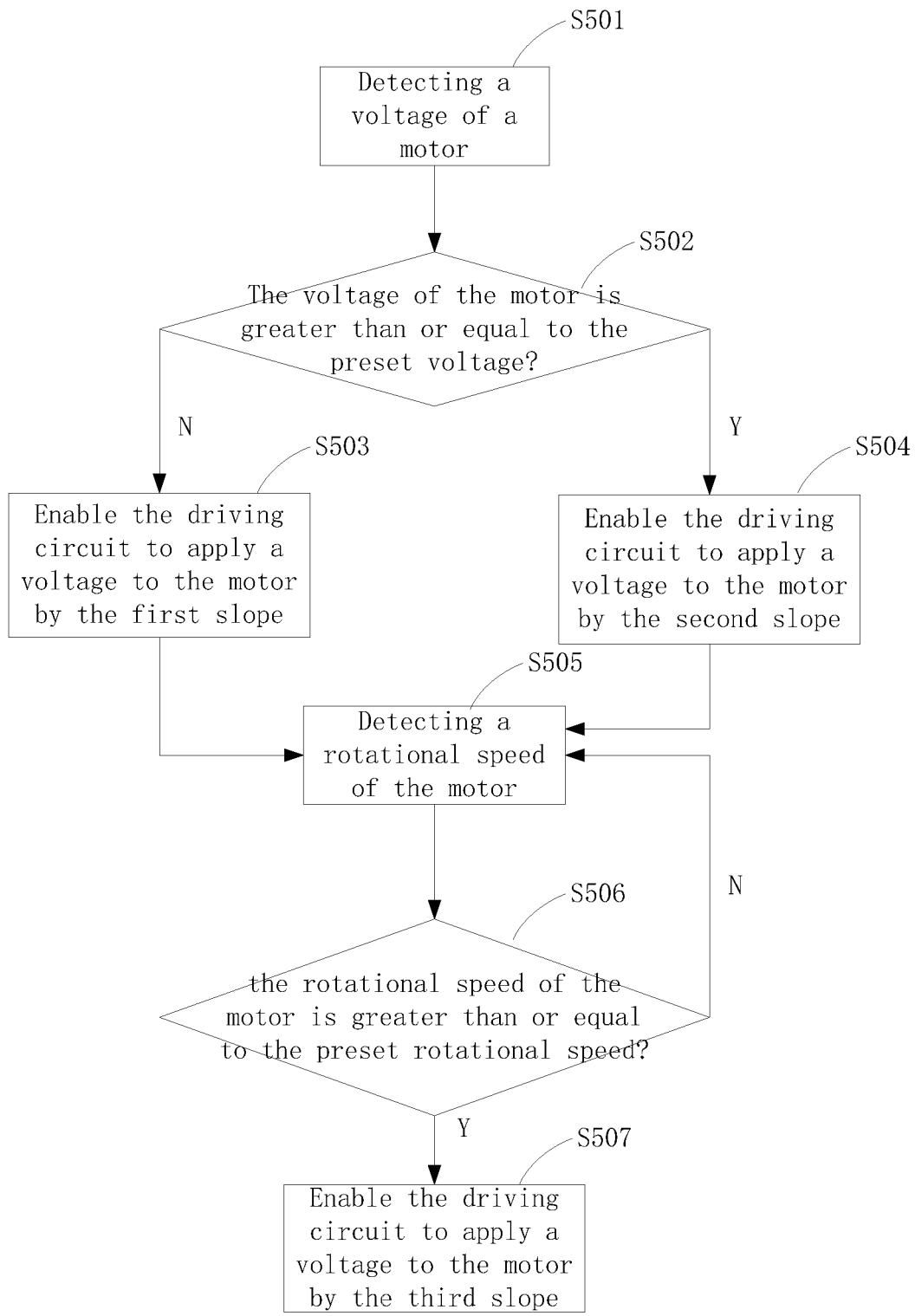
FIG. 5 is a flowchart of a control method for the lawnmower according to an example.

Referring to the method of lawnmower starting under load shown in FIG. 5, the method includes the following steps:

In step of S501, the voltage V of the motor is detected.

In this step, the voltage detection unit detects the voltage of the motor. The voltage of the motor can be either the phase voltage or the bus voltage. In some examples, the voltage detection unit includes a voltage sensor and other peripheral circuits connected to the voltage sensor. In some examples, the voltage detection unit is integrated with the controller.

In step of S502, it is determined whether the voltage of the motor is greater than or equal to the preset voltage V0; if the voltage of the motor is greater than or equal to the preset voltage V0, the process goes to step S504; if the voltage of the motor is less than the preset voltage V0, the process goes to S503.

In this step, the voltage of the motor inputted by the voltage detection unit in the controller is compared with the preset voltage V0 to output corresponding control signals to the driving circuit.

Based on the maximum current withstood by the power tool or the load of the motor 120, the present voltage is obtained. Wherein, the maximum current withstood by the power tool includes the maximum current supported by the driving circuit, the maximum current supported by the motor or the maximum current supported by other electronic components.

In some examples, the preset voltage is obtained based on the maximum current which could be withstood by the driving circuit, and the value of the preset voltage is written to the controller. In some examples, a one-to-one relationship between the maximum current that the driving circuit 122 can withstand and the preset voltage is established, and save it in the tabular form to a storage unit of the power tool. The storage unit could be integrated into the controller or could exist separately.

In step of S503, the driving circuit is controlled to apply a voltage to the motor by the first slope.

In this step, the controller outputs a control signal for the driving circuit to apply a voltage to the motor by the first slope. In some examples, the control signal outputted by the controller is a PWM signal.

In step of S504, the driving circuit is controlled to apply a voltage to the motor with the second slope.

In this step, the controller outputs a control signal to enable the driving circuit to apply a voltage to the motor by the second slope. In some examples, the control signal outputted by the controller is a PWM signal. The PWM signal changes by the second slope. The range of the second slope is greater than or equal to zero and less than or equal to 0.3.

In step of S505, the speed of the motor is detected.

In this step, the rotational speed detection unit detects the rotational speed of the motor. In some examples, the rotational speed detection unit includes hall sensors. Three hall sensors are arranged near the rotor at 60 degree intervals along the rotational direction to detect the speed of the motor. In some examples, the rotational speed detection unit 124 can also use sensorless methods or other types of sensors, such as an optical or magnetic encoder or a resolver.

In step of S506, it is determined whether the rotational speed of the motor is greater than or equal to the preset rotational speed if the rotational speed of the motor is greater than or equal to the preset rotational speed, the process goes to step S507, and if the rotational speed of the motor is less than the preset rotational speed, the process goes to step S505.

In this step, the controller outputs a control signal to the driving circuit according to the motor speed detected by the speed detection unit. The range of the preset speed n is: n≤60% n0, and n0 is the speed of the motor without load.

In step of S507, the driving circuit is controlled to apply a voltage to the motor with the third slope.

In this step, the controller outputs a control signal to enable the driving circuit to apply a voltage to the motor with a third slope. In some examples, the control signal outputted by the controller is a PWM signal. The third slope is greater than the second slope.

Figure 6:
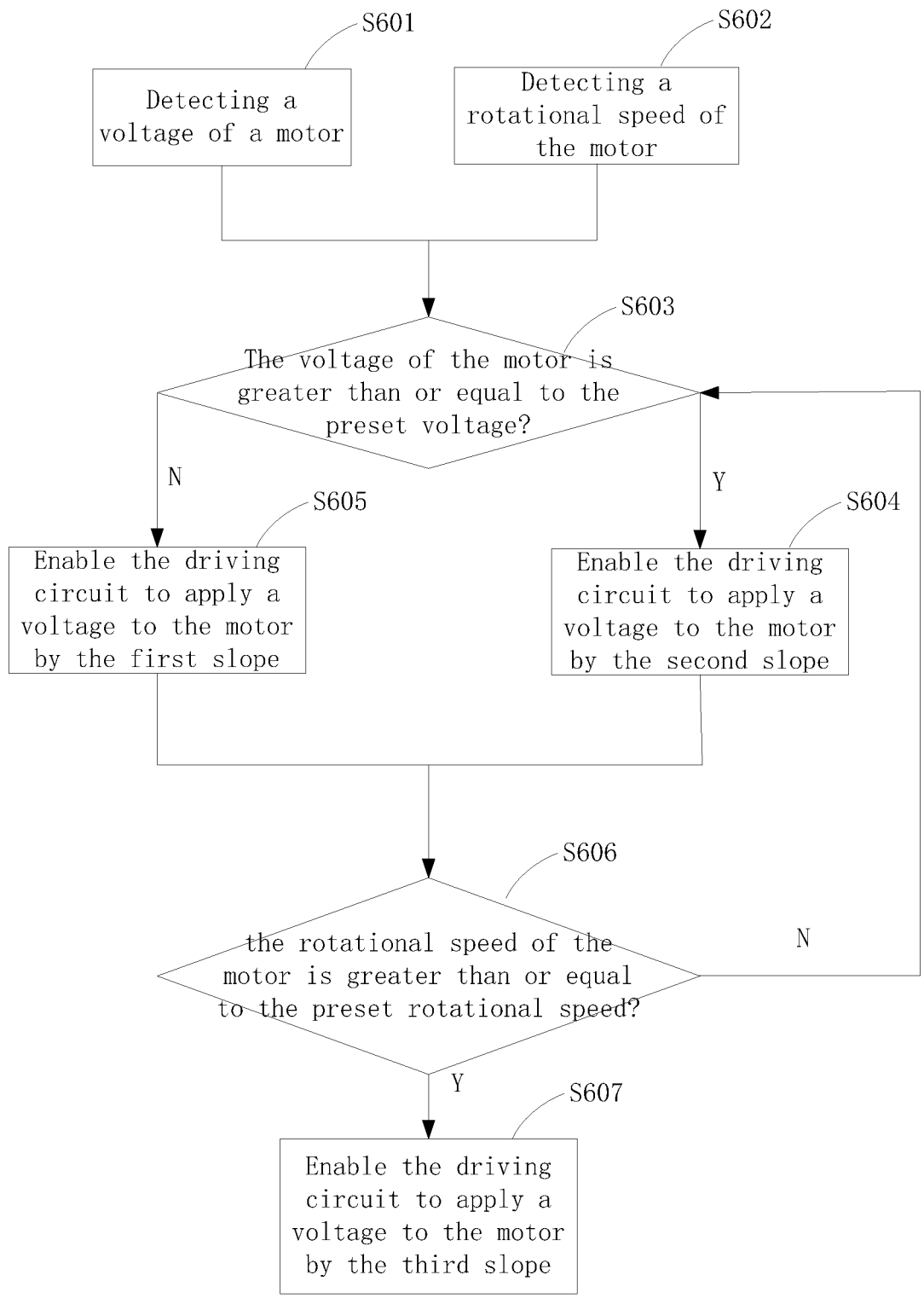
FIG. 6 is a flowchart of a control method for the lawnmower according to another example.

Referring to FIG. 6, another method for starting the lawnmower with a load is performed according to the steps below.

In step of S601, the voltage V of the motor is detected.

In step of S602, the rotational speed of the motor is detected.

In step of S603, it is determined whether the voltage of the motor is greater than or equal to the preset voltage; if the voltage of the motor is greater than or equal to the preset voltage, the process goes to step S604; if the voltage of the motor is less than the preset voltage, the process goes to S605.

In step of S604, the driving circuit is controlled to apply a voltage to the motor by the second slope, wherein the range of the second slope is greater than or equal to zero and less than or equal to 0.3.

In step of S605, the driving circuit is controlled to apply a voltage to the motor with the first slope.

In step of S606, it is determined whether the rotational speed of the motor s greater than or equal to the preset rotational speed, if the rotational speed of the motor is greater than or equal to the preset rotational speed, the process goes to step S607, and if the rotational speed of the motor is less than the preset rotational speed, the process goes to step S603.

The range of the preset speed n is: n≤60% n0, wherein n0 is the speed of the motor 120 without load.

In step of S607, the driving circuit is controlled to apply a voltage to the motor by the third slope.

The starting method for the lawnmower with a load described in FIG. 6 is different than the starting method for the lawnmower with a load described in FIG. 5 in that the voltage V and the rotational speed of the motor 120 can be detected simultaneously.

The above illustrates and describes basic principles, main features and advantages of the present disclosure. Those skilled in the art should appreciate that the above examples do not limit the present disclosure in any form. Technical solutions obtained by equivalent substitution or equivalent variations all fall within the scope of the present disclosure.

What is claimed is:

1. A power tool, comprising:
a motor;
a power supply unit for supplying power to the motor;
a driving circuit electrically connected to the motor to enable the power supply unit to apply a voltage to the motor;
a voltage detection unit for detecting a voltage of the motor; and
a controller, which is configured to control the driving circuit to apply the voltage to the motor at a second slope when the voltage of the motor is greater than or equal to a preset voltage;
wherein the second slope ranges from 0 to 0.3,
further comprising a rotational speed detection unit for detecting a rotational speed of the motor and wherein the controller is configured to control the driving circuit to apply the voltage at a third slope when the detected rotational speed of the motor is greater than or equal to a preset rotational speed and the third slope is greater than the second slope, and
wherein the range of the preset rotational speed n is: n≤60% n0, wherein n0 is the speed of the motor without load.

2. The power tool of claim 1, further comprising a trigger switch, which is configured for enabling the driving circuit to start applying the voltage to the motor, and wherein the controller, which is configured to control the driving circuit to apply the voltage to the motor at a first slope when the voltage of the motor is less than or equal to the preset voltage and the first slope is less than or equal to the third slope.

3. The power tool of claim 1, wherein the controller is configured to determine the preset voltage according to a maximum current which an internal circuit of the power tool can withstand.

4. The power tool of claim 1, wherein the controller selects the preset voltage based on at least one of a maximum current which the driving circuit can withstand and a load of the motor.

5. The power tool of claim 1, wherein the driving circuit comprises a power switch and the controller controls the on or off of the power switch in a pulse-width modulation manner to enable the driving circuit to apply the voltage to the motor at the second slope.

6. The power tool of claim 1, wherein the power supply unit is a battery pack connected to the power tool detachably and the voltage of the battery pack is greater than or equal to 30V.

7. The power tool of claim 1, wherein the power tool is a lawnmower.

8. A control method for a power tool, wherein the power tool comprises a motor and a driving circuit, and the control method comprises:
   detecting a voltage of the motor; and
   controlling the driving circuit to apply the voltage to the motor at a second slope when the voltage of the motor is greater than or equal to a preset voltage;
   wherein the second slope ranges from 0 to 0.3,
   further comprising wherein detecting a rotational speed of the motor and controlling the driving circuit to apply the voltage by a third slope to the motor when the rotational speed of the motor is greater than or equal to a preset rotational speed and wherein the value range of the preset rotational speed n is: n≤60% n0, wherein n0 is the rotational speed of the motor without load.

9. The control method for the power tool of claim 8, wherein the driving circuit is controlled to apply the voltage to the motor at a first slope when the voltage of the motor is less than the preset voltage and the first slope is less than or equal to the third slope.

10. The control method for the power tool of claim 8, wherein the preset voltage is obtained based on a maximum current which the driving circuit can withstand.

11. A control method for a power tool starting with a load, the power tool comprises a motor and the control method comprises:
   detecting a voltage of the motor;
   applying progressive increments of voltage to the motor at a first slope when the power tool is in a first start-up stage; and
   applying a voltage that varies as a second slope to the motor when the power tool is in a second start-up stage;
   wherein the power tool switches from the first start-up stage to the second start-up stage in condition that the voltage of the motor is greater than or equal to a preset voltage,
   further comprising detecting a rotational speed of the motor, causing the power tool to switch from the second start-up stage to a third start-up stage in condition that the rotational speed of the motor is greater than or equal to a preset rotational speed, and applying progressive increments of voltage to the motor at a third slope in condition that the power tool is in a third start-up stage, and
   wherein the range of the preset rotational speed n is: n≤60% n0, wherein n0 is the rotational speed of the motor without load.

12. The control method for the power tool of claim 11, wherein the second slope ranges from 0 to 0.3.

13. The control method for the power tool of claim 11, wherein the preset voltage is obtained according to a maximum current which the power tool is adapted to withstand or the load of the motor.

14. The control method for the power tool of claim 11, wherein the third slope is greater than or equal to the first slope.

* * * * *